US009371905B2

(12) United States Patent
Ota et al.

(10) Patent No.: US 9,371,905 B2
(45) Date of Patent: Jun. 21, 2016

(54) GEAR SHIFT CONTROL APPARATUS FOR VEHICLE

(71) Applicants: Keisuke Ota, Susono (JP); Yoshio Hasegawa, Chiryu (JP); Seiji Masunaga, Susono (JP)

(72) Inventors: Keisuke Ota, Susono (JP); Yoshio Hasegawa, Chiryu (JP); Seiji Masunaga, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 135 days.

(21) Appl. No.: 14/153,147

(22) Filed: Jan. 13, 2014

(65) Prior Publication Data

US 2014/0200778 A1 Jul. 17, 2014

(30) Foreign Application Priority Data

Jan. 17, 2013 (JP) ................................. 2013-006764

(51) Int. Cl.

| | |
|---|---|
| ***F16H 61/00*** | (2006.01) |
| ***F16H 61/04*** | (2006.01) |
| ***F16H 61/686*** | (2006.01) |
| *B60W 20/00* | (2016.01) |
| *B60W 10/10* | (2012.01) |
| *F16H 61/06* | (2006.01) |

(52) U.S. Cl.

CPC .......... *F16H 61/0437* (2013.01); *F16H 61/686* (2013.01); *B60W 10/10* (2013.01); *B60W 20/30* (2013.01); *B60W 2510/10* (2013.01); *B60W 2710/10* (2013.01); *F16H 61/061* (2013.01); *F16H 2061/0093* (2013.01); *F16H 2061/0462* (2013.01)

(58) Field of Classification Search

None

See application file for complete search history.

(56) References Cited

U.S. PATENT DOCUMENTS

2002/0035009 A1 * 3/2002 Saito ..................... F16H 61/061
477/50

FOREIGN PATENT DOCUMENTS

| | | |
|---|---|---|
| JP | 2000-097325 A | 4/2000 |
| WO | 2014/020685 A1 | 2/2014 |

* cited by examiner

*Primary Examiner* — John R Olszewski
*Assistant Examiner* — Gerrad A Foster
(74) *Attorney, Agent, or Firm* — Sughrue Mion, PLLC

(57) ABSTRACT

A torque sharing rate is set as a constraint of a motion equation of an automatic transmission by using a gear shift model in which gear shift target values are set by two values of a torque on a rotating member on an output shaft side and a rotation speed variation of a rotating member on an input shaft side. In addition, a first gear shift according to the gear shift control and a second gear shift that uses a gear shift model in which the gear shift target value is set using only the velocity variation of the rotating member on the input shaft side to enable a speedier gear shift than the first gear shift are selectively executed.

7 Claims, 6 Drawing Sheets

GEAR SHIFT CONTROL APPARATUS FOR VEHICLE

INCORPORATION BY REFERENCE

The disclosure of Japanese Patent Application No. 2013-006764 filed on Jan. 17, 2013 including the specification, drawings and abstract is incorporated herein by reference in its entirety.

BACKGROUND OF THE INVENTION

1. Field of the Invention

This invention relates to a gear shift control apparatus of a vehicle that executes gear shift control of an automatic transmission and, in particular, relates to technology for executing a gear shift of the automatic transmission using a gear shift model.

2. Description of Related Art

Automatic transmissions having a plurality of engaging devices which transmit rotation and torque between an input shaft that receives power from a drive power source and an output shaft that transmits the power to a drive wheel and executing a gear shift by switching between engagement and release of the engaging devices are available. Generally, with such an automatic transmission, adaptation of a demanded value (in other words, a control operation amount) of an operated element (for example, torque) is performed on a control object for each gear stage while performing evaluation on an actual vehicle, and a gear shift is executed based on the adaptation result using a control operation amount determined from a control map obtained in advance for each gear stage. However, as the number of shift stages in automatic transmissions increase, significantly greater effort is required by such adaptation work and, as a result, it is becoming difficult to adopt modes of gear shift control that are based on a control map. Therefore, gear shift model control that is a mode of gear shift control based on a motion equation of each rotating element constituting an automatic transmission is proposed. With such gear shift model control, a control operation amount is uniquely determined by solving a motion equation obtained in advance based on a variation mode (a gear shift target value) that is desirably realized as a result of a gear shift and the determined control operation amount is used to execute a gear shift. For example, Japanese Patent Application Publication No. 2000-97325 (JP 2000-97325 A) describes, with respect to inertia phase control, a technique for executing a gear shift by setting a target value of an input shaft rotation speed of a transmission as a gear shift target value and calculating a demanded value of an engaging-side clutch torque as a control operation amount, and a technique for executing a gear shift by setting respective target values of an input shaft rotation speed and an output shaft torque of a transmission as gear shift target values and calculating a demanded value of an engaging-side clutch torque and a demanded value of a releasing-side clutch torque as control operation amounts using a gear shift model.

SUMMARY OF THE INVENTION

With the techniques described in JP 2000-97325 A, a gear shift is executed by either operating one control object with respect to one gear shift target value or operating two control objects with respect to two gear shift target values. However, with the techniques described in JP 2000-97325 A, since hydraulic pressure of a releasing-side engaging device is reduced towards release and subsequently temporarily increased once again toward engagement in order to cancel an inertia torque in an inertia phase (in other words, in order to prevent an output shaft torque in an inertia phase from substantially varying), there is a possibility that gear shift completion may be delayed and that drivability may decline. Meanwhile, there is a conventional method of so-called engine torque down control in which engine torque is temporarily reduced in an inertia phase in order to cancel the inertia torque. However, with the technique described in JP 2000-97325 A, the engine is not incorporated into the motion equation as a control object. In other words, with the technique described in JP 2000-97325 A, since the motion equation is solved with respect to a random engine torque, the gear shift model control described in JP 2000-97325 A is incapable of canceling an inertia torque by engine torque down control in place of temporarily increasing hydraulic pressure at the releasing-side engaging device. In this case, while engine torque down control can be executed separate from gear shift model control, such a procedure causes the entire gear shift model control to collapse and requires a solution to be once again derived from the motion equation, and may end up delaying gear shift completion or increasing gear shift shock which may cause a decline in drivability. On the other hand, attempting to uniquely determine an engine torque as a control operation amount by gear shift model control produces three control operation amounts with respect to two gear shift target values. As a result, the motion equation cannot be solved and a gear shift of the automatic transmission using gear shift model control can no longer be executed.

Problems such as those described above are not conventional, and no proposals have been made so far regarding appropriately setting a constraint for solving a motion equation when there are three control operation amounts with respect to two gear shift target values so as to enable a prescribed gear shift model to accommodate all gear shift patterns (gear shift modes) including power-on upshift, power-off upshift, power-on downshift, and power-off downshift. In contrast, this invention proposes a new technique for appropriately setting a constraint to solve a motion equation (refer to international application previously filed by the applicant (International Application No.: PCT/JP2012/069408)). In addition, the invention proposes a technique which is a further improvement of a gear shift technique based on the new technique described above and which enables selection of a first gear shift corresponding to the gear shift control technique and a second gear shift corresponding to a gear shift control technique that prioritizes gear shift speed for executing a gear shift at a higher speed than the first gear shift.

The invention has been made in consideration of the circumstances above and an object of the invention is to provide a gear shift control apparatus for a vehicle capable of executing a desired gear shift of an automatic transmission using a gear shift model even if there are three control operation amounts with respect to two gear shift target values.

One aspect of the invention relates to a gear shift control apparatus of a vehicle. The gear shift control apparatus includes an automatic transmission and a electronic control unit. The automatic transmission includes a plurality of engaging devices configured to transmit rotation and torque between an input shaft that receives power from a drive power source and an output shaft that transmits the power to a drive wheel. The automatic transmission is configured to execute a gear shift by switching between engagement and release of the plurality of engaging devices. The electronic control unit is configured to execute the gear shift of the automatic transmission by using a predetermined gear shift model that determines a control operation amount for obtaining a gear shift target value. The electronic control unit is configured to selectively execute a first gear shift and a second gear shift as the gear shift. The electronic control unit is configured to set the gear shift target value of the first gear shift by using torque on a rotating member on an output shaft side among the engaging devices and a rotation speed variation of a rotating member on an input shaft side among the engaging devices. The electronic control unit is configured to set the control operation amount of the first gear shift by using torque on the rotating member on the input shaft side, a torque capacity of an engaging-side engaging device during the first gear shift, and a torque capacity of a releasing-side engaging device during the first gear shift. The electronic control unit is configured to set a first torque sharing rate of a transmission torque that is shared between the engaging-side engaging device and the releasing-side engaging device during the first gear shift. The electronic control unit is configured to control the gear shift of the automatic transmission during the first gear shift by using the gear shift model including the set gear shift target value of the first gear shift, the set control operation amount of the first gear shift, and the set first torque sharing rate. The electronic control unit is configured to set the gear shift target value of the second gear shift by using only the rotation speed variation of the rotating member on the input shaft side. The electronic control unit is configured to set the control operation amount of the second gear shift by using torque on the rotating member on the input shaft side, a torque capacity of the engaging-side engaging device during the second gear shift, and a torque capacity of the releasing-side engaging device during the second gear shift. The electronic control unit is configured to set a second torque sharing rate of a transmission torque that is shared between the engaging-side engaging device and the releasing-side engaging device during the second gear shift. The electronic control unit is configured to set a gear shift progress torque sharing rate that is a sharing rate of a transmission torque that is shared between the rotating member on the input shaft side and an entirety of the engaging devices during the second gear shift. The electronic control unit is configured to control the gear shift of the automatic transmission during the second gear shift in a speedier manner than during the first gear shift by using the gear shift model including the set gear shift target value of the second gear shift, the set control operation amount of the second gear shift, the set second torque sharing rate, and the set gear shift progress torque sharing rate.

Accordingly, when three control operation amounts must be determined in order to realize two gear shift target values, since a torque sharing rate of a transmission torque that is shared between the releasing-side engaging device and the engaging-side engaging device is set as a constraint in consideration of the fact that the control operation amounts cannot be determined unless some kind of constraint is set, the gear shift control apparatus of the vehicle is suitable for controlling delivery of torque between the releasing-side engaging device and the engaging-side engaging device (in other words, a gear shift progress) that is considered difficult in gear shift control and the three control operation amounts can be determined. From another perspective, when any control operation amount is set to a prescribed value determined in advance in order to determine three control operation amounts, there are an infinite number of the prescribed value including a value conforming to each gear shift pattern. In contrast, with the first gear shift according to the invention, since the torque sharing rate expressing delivery of a torque is set as a constraint, any gear shift pattern can be accommodated by a prescribed gear shift model. Specifically, when only one of the torque capacity of the engaging-side engaging device and the torque capacity of the releasing-side engaging device is set as a constraint, a tie-up or a blow-up of a rotating member may occur. However, by setting the torque sharing rate suitable for controlling gear shift progress as a constraint, an occurrence of the tip-up or the blow-up can be suppressed or, conversely, controllability of control for intentionally generating a tie-up or a blow-up can be improved. Furthermore, setting a torque on the input shaft-side rotating member as a constraint may prevent control for temporarily varying an output torque of the drive power source from being executed. However, according to the invention, for example, torque down control that temporarily reduces the output torque of the drive power source during an inertia phase can be suitably executed. As shown, with the first gear shift according to the invention, even if there are three control operation amounts with respect to two gear train motion equations corresponding to two gear shift target values, the three control operation amounts can be appropriately determined using a gear shift model expressed by the two gear train motion equations and a desired gear shift of the automatic transmission that realizes the two gear shift target values can be selectively executed.

In addition, with the second gear shift according to the invention, by setting the gear shift target values solely based on a rotation speed variation of a rotating member on the input shaft side, using a gear train motion equation having a rotation speed variation of a rotating member on the input shaft side as a gear shift target value instead of using a gear train motion equation having a torque of a rotating member on the output shaft side as a gear shift target value, using three values including a torque on a rotating member on the input shaft side, a torque capacity of an engaging-side engaging device during the gear shift, and a torque capacity of a releasing-side engaging device during the gear shift as control operation amounts (control demanded values) with respect to the gear train motion equation, and using a torque sharing rate of a transmission torque that is shared between the engaging-side engaging device and the releasing-side engaging device during the gear shift and a gear shift progress torque sharing rate that is a sharing rate of a transmission torque that is shared between the rotating member on the input shaft side and an entirety of the engaging devices (clutches) during the gear shift, the second gear shift in which a gear shift of the automatic transmission is controlled at a higher speed than the first gear shift can be executed using a gear shift model expressed by the gear train motion equation. Therefore according to the invention, since a first gear shift and a second gear shift that enables a gear shift to proceed at a higher speed than the first gear shift can be selectively executed, for example, with a gear shift in which a direction of an input shaft torque and a direction in which the gear shift is to proceed (a direction in which an input shaft rotation speed increases) are consistent with each other such as a down gear shift during deceleration travel or a power-off up gear shift, a speedy gear shift is achieved by selecting the second gear shift.

In the gear shift control apparatus described above, the electronic control unit may be configured to set the first torque sharing rate as a ratio at which torque on the rotating member on the input shaft side is shared between the engaging-side engaging device and the releasing-side engaging device when the transmission torque that is shared between the engaging-side engaging device and the releasing-side engaging device during the first gear shift is assumed to be the torque on the rotating member on the input shaft side. In addition, the electronic control unit may be configured to set the second torque sharing rate as a ratio at which torque on the rotating member on the input shaft side is shared between the engaging-side engaging device and the releasing-side engaging device when the transmission torque that is shared between the engaging-side engaging device and the releasing-side engaging device during the second gear shift is assumed to be the torque on the rotating member on the input shaft side. Furthermore, the electronic control unit may be configured to set the gear shift progress torque sharing rate to be a torque sharing rate when a transmission torque that is shared between the rotating member on the input shaft side and the entirety of the engaging devices during the second gear shift is assumed to be torque on the rotating member on the input shaft side.

In the gear shift control apparatus described above, the electronic control unit may be configured to set the gear shift model of the first gear shift to include a first gear train motion equation having the rotation speed variation of the rotating member on the input shaft side as the gear shift target value and the control operation amount and a second gear train motion equation having the torque on the rotating member on the output shaft side as the gear shift target value and the control operation amount. In addition, the electronic control unit may be configured to set, by using the first torque sharing rate, the gear shift model of the first gear shift in which the control operation amount is calculated based on the gear shift target value. Accordingly, control related to torque delivery between the releasing-side engaging device and the engaging-side engaging device which is considered difficult in gear shift control can be reflected in a motion equation and the three control operation amounts can be appropriately determined.

In the gear shift control apparatus described above, the electronic control unit may be configured to set the gear shift model of the second gear shift so as to include a first gear train motion equation having the rotation speed variation of the rotating member on the input shaft side as the gear shift target value and the control operation amount. In addition, the electronic control unit may be configured to set, using the second torque sharing rate and the gear shift progress torque sharing rate, the gear shift model of the second gear shift in which the control operation amount is calculated based on the gear shift target value. Accordingly, control related to torque delivery between the releasing-side engaging device and the engaging-side engaging device which is considered difficult in gear shift control can be reflected in a motion equation, the three control operation amounts can be appropriately determined.

With the gear shift model used for the second gear shift, in the gear shift control apparatus described above, the electronic control unit may be configured to set the gear shift progress torque sharing rate to be a sharing rate of a transmission torque that is shared by the entirety of the engaging devices and a torque sharing rate of the rotating member on the input shaft side. In addition, the electronic control unit may be configured to set the sharing rate of a transmission torque that is shared by the entirety of the engaging devices and the torque sharing rate of the rotating member on the input shaft side to respectively be “1” and “0” before a start of an inertia phase of the second gear shift and to respectively be “0” and “1” after the start of the inertia phase of the second gear shift. By setting the torque sharing rate of the engaging-side engaging device and the torque sharing rate of the releasing-side engaging device as described above, a second gear shift that proceeds at high speed can be achieved.

With the gear shift model used for the second gear shift, in the gear shift control apparatus described above, the electronic control unit may be configured to set the torque sharing rate of the engaging-side engaging device and the torque sharing rate of the releasing-side engaging device to respectively be “0” and “1” before a start of an inertia phase of the second gear shift and to respectively be “1” and “0” after the start of the inertia phase of the second gear shift as the second torque sharing rate. By setting the torque sharing rate of the engaging-side engaging device and the torque sharing rate of the releasing-side engaging device as described above, a second gear shift that proceeds at high speed can be achieved.

On the basis of a gear shift in which a direction of an input shaft torque and a direction in which the gear shift is to proceed (a direction in which an input shaft rotation speed increases) are consistent with each other such as a manual gear shift operation including a manual mode and a sport mode and/or a down gear shift during deceleration travel or a power-off up gear shift, the gear shift control apparatus may be configured to include a gear shift speed-prioritized gear shift determining unit that determines whether or not gear shift control that prioritizes gear shift speed is to be selected, and the gear shift control apparatus may be configured to select the second gear shift when the gear shift speed-prioritized gear shift determining unit determines that gear shift control prioritizing gear shift speed is to be selected and to select the first gear shift when the gear shift speed-prioritized gear shift determining unit determines that gear shift control prioritizing gear shift speed is not to be selected. In other words, in the gear shift control apparatus, the electronic control unit may be configured to determine whether a demanded gear shift is a gear shift in which a direction of an input shaft torque of the input shaft and a direction in which a rotation speed of the rotating member on the input shaft side increases are consistent with each other. The electronic control unit may be configured to determine whether gear shift control that prioritizes gear shift speed is to be selected based on the demanded gear shift being the gear shift in which the direction of the input shaft torque of the input shaft and the direction in which the rotation speed of the rotating member on the input shaft side increases are consistent with each other. The electronic control unit may be configured to select the second gear shift when the electronic control unit determines that the gear shift control prioritizing gear shift speed is to be selected. The electronic control unit may be configured to select the first gear shift when the electronic control unit determines that the gear shift control prioritizing gear shift speed is not to be selected. Accordingly, since the second gear shift that achieves speedy gear shift progress is selected for a manual gear shift operation and/or a gear shift in which a direction of an input shaft torque and a direction in which the gear shift is to proceed (a direction in which an input shaft rotation speed increases) are consistent with each other, a preferable gear shift feel can be achieved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3A to 3D are time charts illustrating gear shift control actuations of a first gear shift control unit shown in FIG. 2 and are diagrams showing examples of timings where a torque sharing rate is varied which are determined in advance for each gear shift pattern, wherein: FIG. 3A represents a case of a power-on upshift; FIG. 3B represents a case of a power-on downshift, FIG. 3C represents a case of a power-off upshift, and FIG. 3D represents a case of a power-off downshift;

DETAILED DESCRIPTION OF EMBODIMENTS

Hereinafter, embodiments of the invention will be described in detail with reference to the drawings.

Figure 1:
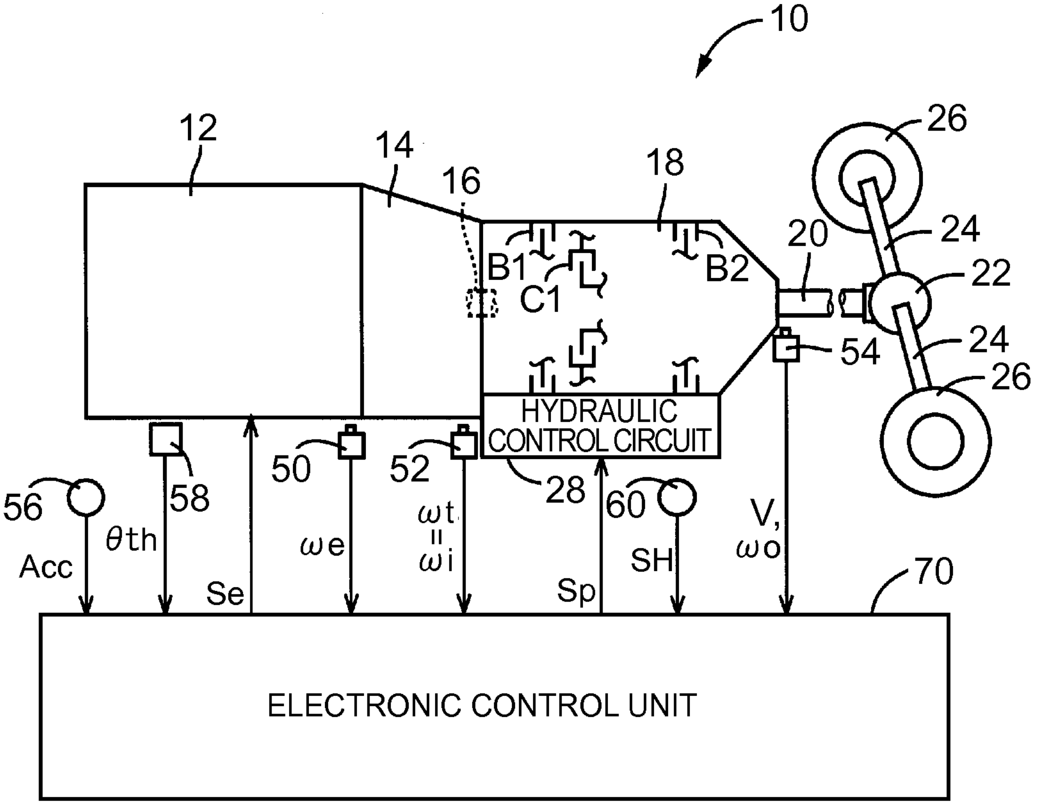
FIG. 1 is a diagram illustrating a schematic configuration of a power transmission path in a vehicle to which the invention is applied and also illustrating a substantial part of a control system provided in the vehicle.

FIG. 1 is a diagram illustrating a schematic configuration of a power transmission path from an engine 12 to a drive wheel 26 provided in a vehicle 10 to which the invention is applied and also illustrating a substantial part of a control system provided in the vehicle 10. In FIG. 1, power generated by the engine 12 as a drive power source is inputted from an input shaft 16 to an automatic transmission 18 via a torque converter 14 and is transmitted from an output shaft 20 of the automatic transmission 18 to left and right drive wheels 26 sequentially via a differential gear device (differential gear) 22, a pair of axles (drive shafts) 24, and the like.

The automatic transmission 18 is a conventional planetary gear-type automatic transmission which includes, in a transmission case as a non-rotating member attached to a vehicle body, one set or a plurality of sets of planetary gear devices and a plurality of engaging devices (engaging elements) that selectively couple rotating elements of the planetary gear devices or couple any of the rotating elements and the non-rotating member to each other and in which a plurality of gear stages are alternatively established by the engaging devices. For example, the automatic transmission 18 is a stepped transmission which performs a so-called clutch-to-clutch gear shift in which a gear shift is executed by clutch-switching of any of the plurality of engaging devices (in other words, by switching between engagement of a prescribed engaging device and release of another engaging device). For example, the plurality of engaging devices are hydraulic frictional engaging devices in which a friction force between friction plates is generated when hydraulic pressure is applied and which transmits rotation and torque between the input shaft 16 that receives power from the engine 12 and the output shaft 20 that transmits the power to the drive wheels 26. The input shaft 16 is an input shaft of the automatic transmission 18 but also functions as a turbine shaft that is rotationally driven by a turbine wheel of the torque converter 14.

The hydraulic frictional engaging devices are clutches or brakes whose engagement and release are respectively controlled by the hydraulic control circuit 28 and whose torque capacity or, in other words, engaging force is varied by regulating pressure of a solenoid valve or the like in the hydraulic control circuit 28 to selectively couple members on both sides of the hydraulic frictional engaging device between which the hydraulic frictional engaging device is inserted. In this case, a torque capacity of a hydraulic engaging device (hereinafter, referred to as a clutch torque) is determined by, for example, a friction coefficient of a friction material or engaging hydraulic pressure that presses against a friction plate. In order to transmit a torque between the input shaft 16 and the output shaft 20 (for example, a transmission input torque Ti that is inputted to the input shaft 16 or, in other words, a turbine torque Tt) without causing slipping of an engaging device (in other words, without generating a differential rotation speed in the engaging device), a torque capacity is required which produces an amount of transmission torque that must be shared by each engaging device (in other words, a shared torque of the engaging device) with respect to the torque to be transmitted. However, with a torque capacity that produces a transmission torque amount, the transmission torque does not increase even when the torque capacity is increased. Moreover, in the embodiment, a clutch torque and engaging hydraulic pressure (or instruction pressure) are sometimes used synonymously for the sake of convenience.

Examples of gear stages in the automatic transmission 18 include a low speed-side gear stage (a low side gear stage such as a second speed gear stage) that is established by an engagement of a clutch C1 and a brake B1 and a high speed-side gear stage (a high side gear stage such as a third speed gear stage) that is established by an engagement of the clutch C1 and a brake B2. Therefore, during a gear shift between the low gear stage and the high gear stage, clutch-switching is performed between the brake B1 and the brake B2. In the embodiment, among the engaging devices that are clutch-switched during a gear shift, an engaging device involved in establishing a low side gear stage (for example, the brake B1) will be referred to as a low gear stage engaging device, and an engaging device involved in establishing a high gear stage (for example, the brake B2) will be referred to as a high gear stage engaging device. A low gear stage engaging device becomes a releasing-side engaging device (hereinafter, referred to as a releasing-side clutch) during an upshift from a low gear stage to a high gear stage and becomes an engaging-side engaging device (hereinafter, referred to as an engaging-side clutch) during a downshift from a high gear stage to a low gear stage. On the other hand, a high gear stage engaging device becomes an engaging-side clutch during the upshift and a releasing-side clutch during the downshift.

Returning to FIG. 1, for example, the vehicle 10 is provided with an electronic control unit 70 that includes a gear shift control apparatus related to gear shift control of the automatic transmission 18 or the like. The electronic control unit 70 is configured to include, for example, a so-called microcomputer provided with a central processing unit (CPU), a random access memory (RAM), a read only memory (ROM), an input/output interface, and the like, and the CPU executes various types of control of the vehicle by performing signal processing according to a program stored in the ROM in advance while using a temporary storage function of the RAM. For example, the electronic control unit 70 is configured to execute output control of the engine 12, gear shift control of the automatic transmission 18, and the like and is separated into components for engine control, hydraulic control (gear shift control), and the like when necessary. In addition, the electronic control unit 70 is respectively supplied with various signals such as an engine rotation speed we that represents a rotation speed of the engine 12, a turbine rotation speed ωt that represents a rotation speed of the input shaft 16 or, in other words, a transmission input rotation speed ωi, a transmission output rotation speed ωo that represents a rotation speed of the output shaft 20 corresponding to a vehicle speed V, an accelerator depression amount Acc that represents a demand of a driver with respect to a drive force (drive torque) of the vehicle 10, a throttle valve opening amount θth, and a shift operation SH performed by a shift lever or a paddle switch which are detected by various sensors including respective rotation speed sensors 50, 52, and 54, an accelerator depression amount sensor 56, a throttle valve opening amount sensor 58, and a shift sensor 60. Furthermore, an engine output control command signal Se for output control of the engine 12, a hydraulic pressure command signal Sp for actuating the hydraulic control circuit 28 that controls the hydraulic actuators of the automatic transmission 18, and the like are respectively outputted from the electronic control unit 70.

Figure 2:
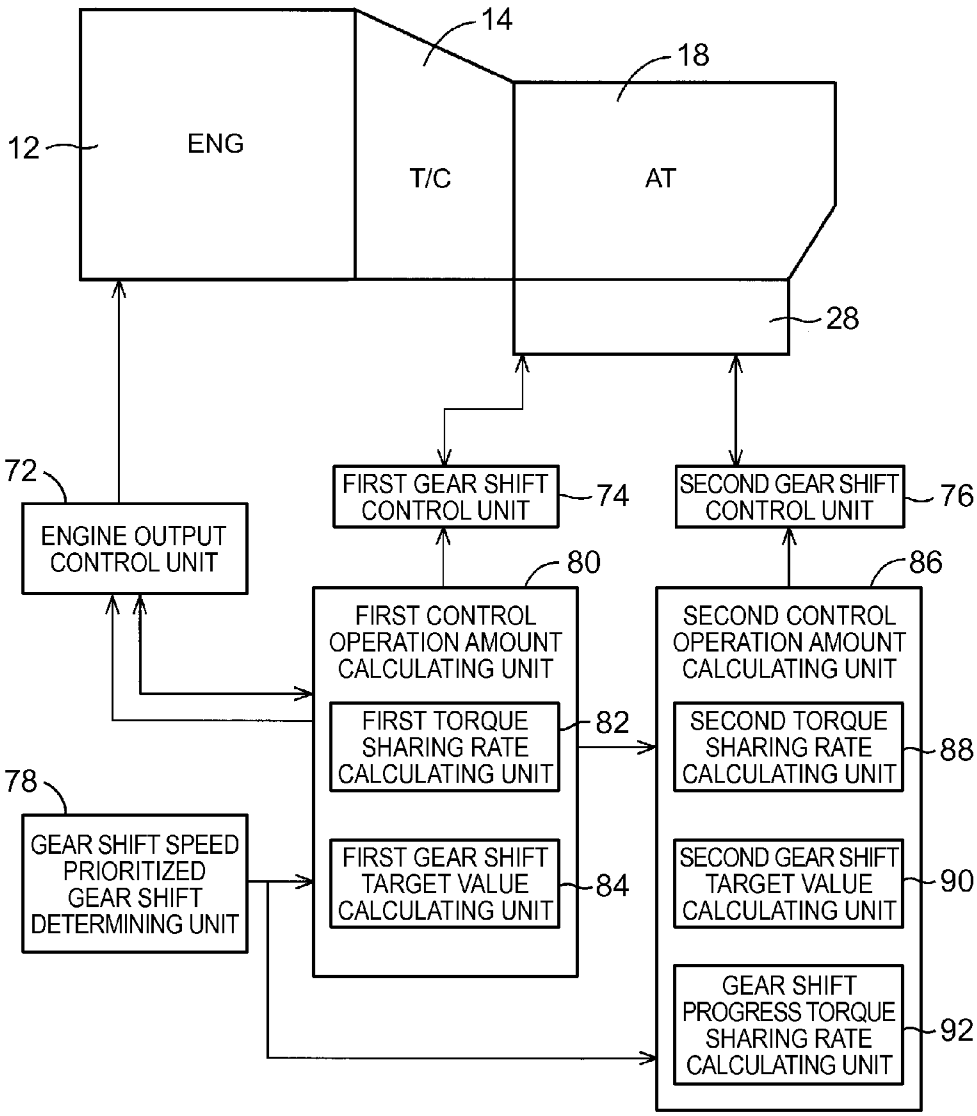
FIG. 2 is a functional block diagram illustrating a substantial part of a control function of an electronic control unit.

FIG. 2 is a functional block diagram illustrating a substantial part of a control function provided by the electronic control unit 70. In FIG. 2, for example, an engine output control unit 72 outputs an engine output control command signal Se which controls opening and closing of an electronic throttle valve using a throttle actuator for throttle control, controls a fuel injection amount of an fuel injection device for fuel injection amount control, and controls an ignition device such as an igniter for ignition timing control so that an engine torque Te that is demanded (hereinafter, a demanded engine torque Tedem) is obtained. For example, using the accelerator depression amount Acc as a parameter, the engine output control unit 72 calculates a demanded drive force Fdem based on an actual accelerator depression amount Acc and a vehicle speed V from a relationship (a drive force map, not shown) stored in advance between the vehicle speed V and the demanded drive force Fdem. In addition, for example, the engine output control unit 72 calculates the demanded engine torque Tedem that produces the demanded drive force Fdem based on an effective tire radius of the drive wheels 26, a gear ratio of a gear stage of the automatic transmission 18, a final deceleration ratio in the power transmission path that is closer to the drive wheels 26 than the output shaft 20, and a torque ratio t of the torque converter 14. Moreover, the torque ratio t of the torque converter 14 is calculated based on an actual speed ratio e from an already available relationship (an actuation characteristic diagram of the torque converter 14) which is stored in advance among a speed ratio (=turbine rotation speed ωt/pump rotation speed ωp (engine rotation speed ωe)), the torque ratio t, efficiency, and a capacity coefficient.

A first gear shift control unit 74 and a second gear shift control unit 76 respectively execute gear shift control of the automatic transmission 18. For example, the first gear shift control unit 74 and the second gear shift control unit 76 perform gear shift determination so that the demanded drive force Fdem is obtained. Alternatively, the first gear shift control unit 74 and the second gear shift control unit 76 perform gear shift determination based on a vehicle state expressed by an actual vehicle speed V and an actual accelerator depression amount Acc from a relationship stored in advance which uses a vehicle speed V and an accelerator depression amount Acc as variables (a gear shift map or a gear shift diagram). In addition, when the first gear shift control unit 74 and the second gear shift control unit 76 determine that a gear shift of the automatic transmission 18 is to be performed, the first gear shift control unit 74 and the second gear shift control unit 76 execute automatic gear shift control of the automatic transmission 18 so that a desired gear stage is obtained. For example, the first gear shift control unit 74 and the second gear shift control unit 76 execute a clutch-to-clutch gear shift by outputting a hydraulic pressure command signal Sp that engages and/or releases an engaging device involved in a gear shift of the automatic transmission 18 to the hydraulic control circuit 28 so that the determined gear stage is achieved. Examples of the hydraulic pressure command signal Sp include a hydraulic pressure command value for obtaining a torque capacity of a releasing-side clutch (hereinafter, referred to as a releasing-side clutch torque) and a hydraulic pressure command value for obtaining a torque capacity of an engaging-side clutch (hereinafter, referred to as an engaging-side clutch torque).

Methods of clutch-to-clutch gear shift control include, for example, determining a torque capacity (or a hydraulic pressure command value) during a gear shift from a control map determined in advance by adaptation while evaluating whether or not a gear shift shock, a gear shift time, or the like is appropriate on an actual vehicle and executing a gear shift of the automatic transmission 18. With a method using a control map such as described above, different control maps must be created depending on what type of gear shift is to be used for the gear shift. Therefore, the larger the number of gear stages in the automatic transmission 18, the greater the effort that is required by the adaptation work described above. Examples of the types of gear shift described above include various gear shift modes expressed by combinations of various gear shift patterns (gear shift modes) such as a power-on upshift, a power-off upshift, a power-on downshift, and a power-off downshift, and various gear interstages such as first speed → second speed. More specifically, types of a gear shift is expressed as first speed second speed power-on upshift, second speed → first speed power-on downshift, or the like.

In consideration thereof, the embodiment adopts a method of executing a gear shift of the automatic transmission 18 to implement clutch-to-clutch gear shift control by using a gear shift model determined in advance for determining control operation amounts that realize gear shift target values in place of the method using a control map described above. A gear shift target value is a target value of an element (for example, a gear shift time, a drive force, and the like) which determines a variation mode that is desirably realized during a gear shift. A control operation amount is a demanded value of an element (an engine torque, a clutch torque, or the like) which is operated with respect to a control object.

Gear shift control of the automatic transmission 18 using a gear shift model according to the embodiment will be described in detail below. A motion equation during a gear shift of the automatic transmission 18 is represented by Expressions (1) and (2) below. Expressions (1) and (2) are derived from a motion equation of each of the rotating elements coupled to each other which constitute the automatic transmission 18 and a relational expression of a planetary gear device that constitutes the automatic transmission 18. The motion equation of each of the rotating elements is a motion equation that defines a torque expressed by a product of inertia at each rotating element and a rotation speed time variation rate using torques that act on three members (a sun gear, a carrier, and a ring gear) of the planetary gear device and a member that is involved in each rotating element among members on both sides of an engaging device. In addition, the relational expression of a planetary gear device is a relational expression that respectively defines a relationship of torque and a relationship of a rotation speed time variation rate among the three members of the planetary gear device using a gear ratio (=the number of teeth on the sun gear/the number of teeth on the ring gear) of the planetary gear device. In Expressions (1) and (2), dωt/dt denotes a time differential or, in other words, a time variation rate of the turbine rotation speed ωt (in other words, the transmission input rotation speed ωi) and represents an angular acceleration of the input shaft 16 (hereinafter, an input shaft angular acceleration) as a velocity variation (rotation speed variation) of a rotating member on the side of the input shaft 16 (in the drawings and the expressions, the time variation rate is denoted; the same applies to other time variation rates in the description below). dωo/dt denotes a time variation rate of the transmission output rotation speed ωo and represents an output shaft angular acceleration. Tt represents a turbine torque that is a torque on the input shaft 16 as a torque on a rotating member on the side of the input shaft 16 or, in other words, the transmission input torque Ti. The turbine torque Tt is synonymous with the engine torque Te (=Tt/t) if the torque ratio t of the torque converter 14 is to be considered. To denotes a transmission output torque that is a torque on the output shaft 20 as a torque on a rotating member on the side of the output shaft 20. Tcapl denotes an engaging-side clutch torque which becomes a high gear stage-side clutch torque during an upshift and a low gear stage-side clutch torque during a downshift. Tcdrn denotes a releasing-side clutch torque which becomes a low gear stage-side clutch torque during an upshift and a high gear stage-side clutch torque during a downshift. a1, a2, b1, b2, c1, c2, d1, and d2 respectively denote constants used when deriving Expressions (1) and (2) and are designed coefficients determined from inertia at the respective rotating elements and a gear ratio of the planetary gear device described above. For example, specific numerical values of the constants differ for each type of gear shift (for example, each gear shift pattern or each gear interstage). Therefore, even though there is one prescribed equation as the motion equation described above, motion equations corresponding to respective types of gear shifts that are considered to be different constants are used per gear shift type when performing a gear shift of the automatic transmission 18.

[Math. 1]

$$\dot{\omega}t=a1\cdot Tt+b1\cdot Tcapl+c1\cdot Tcdrn+d1\cdot\dot{\omega}o \tag{1}$$

$$To=a2\cdot Tt+b2\cdot Tcapl+c2\cdot Tcdrn+d2\cdot\dot{\omega}o \tag{2}$$

Expressions (1) and (2) are gear train motion equations of the automatic transmission 18 which formulate a relationship between a gear shift target value and a control operation amount. The gear shift target value in this case is capable of expressing respective target values of a gear shift time and a drive force and is handled on a gear train motion equation. The embodiment uses the input shaft angular acceleration dωt/dt as an example of an element capable of expressing a gear shaft time. In addition, the first embodiment uses the transmission output torque To as an example of an element capable of expressing a drive force. In other words, in the embodiment, a gear shift target value is set by two values including the input shaft angular acceleration dωt/dt and the transmission output torque To. Meanwhile, in the embodiment, a control operation amount that establishes the gear shift target value is set by three values including the turbine torque Tt (synonymous with engine torque Te), the engaging-side clutch torque Tcapl, and the releasing-side clutch torque Tcdrn. As a result, since there are three control operation amounts as compared to the motion equation being constituted by two expressions including Expressions (1) and (2) above, the control operation amounts that establish the two gear shift target value cannot be uniquely solved. Therefore, a desired gear shift of the automatic transmission 18 that realizes the two gear shift target values cannot be executed using the gear shift model. Moreover, the output shaft angular acceleration dωo/dt is calculated from the transmission output rotation speed ωo that is a detected value of the rotation speed sensor 54.

This being said, the control operation amounts can be uniquely solved by adding a constraint to the motion equation represented by Expressions (1) and (2). In the gear shift control of the automatic transmission 18, controlling delivery of a torque (in other words, a gear shift progress) between a releasing-side clutch and an engaging-side clutch is considered difficult. On the other hand, when any control operation amount is set to a prescribed value in order to determine the three control operation amounts, an infinite number of the prescribed values can be adopted including a prescribed value conforming to each gear shift pattern. Regarding the prescribed value, for example, when only one of the releasing-side clutch torque Tcdrn and the engaging-side clutch torque Tcapl is set as a constraint, a tie-up or a blow-up is more likely to occur during a gear shift or controllability of control for intentionally generating a tie-up or a blow-up during a gear shift may decline. Alternatively, for example, when an engine torque variation mode is set as a constraint, there is a possibility that engine torque down control in which engine torque is temporarily varied in an inertia phase cannot be executed. In consideration thereof, in the embodiment, a finding has been made to set, as the constraint, a torque sharing rate of a transmission torque shared between the releasing-side clutch and the engaging-side clutch which is suitable for expressing and controlling delivery of a torque during a gear shift and which is capable of accommodating any gear shift pattern. In other words, a finding has been made to set a torque sharing rate of a transmission torque which is capable of incorporating delivery of a torque during a gear shift into the motion equation and which is capable of uniquely solving the control operation amounts as the constraint. When a total transmission torque which must be shared by the releasing-side clutch and the engaging-side clutch during a gear shift of the automatic transmission 18 is replaced with, for example, a torque on the input shaft 16 (an input shaft total transmission torque), the torque sharing rate is a ratio of the transmission torque that is respectively shared by both engaging devices with respect to the input shaft total transmission torque. In the embodiment, if a torque sharing rate of an engaging-side clutch is denoted by "xapl" and a torque sharing rate of a releasing-side clutch is denoted by "xdrn", then the respective torque sharing rates are defined as Expressions (3) and (4) below using a torque sharing rate x (for example, $0\leq x\leq 1$) which varies in a time series so as to reflect a delivery of a torque during a gear shift.

$$xapl=x \tag{3}$$

$$xdrn=1-x \tag{4}$$

A relational expression between the engaging-side clutch torque Tcapl and the releasing-side clutch torque Tcdrn can be defined using "x" (=xapl) and "1−x" (=xdrn) based on "Tcapl" and "Tcdrn" replaced with torques on the input shaft 16 and on Expressions (3) and (4) above. In addition, from Expressions (1) and (2) above and the relational expression between "Tcapl" and "Tcdrn", a relational expression for calculating the turbine torque Tt, the engaging-side clutch torque Tcapl, and the releasing-side clutch torque Tcdrn which are control operation amounts is derived. The turbine torque Tt (synonymous with engine torque Te) is represented by a relational expression using "x" (=xapl), "1−x" (=xdrn), the input shaft angular acceleration dωt/dt, the transmission output torque To, and the like. In a similar manner, the engaging-side clutch torque Tcapl is represented by a relational expression using "x" (=xapl), the input shaft angular acceleration dωt/dt, the transmission output torque To, and the like. In a similar manner, the releasing-side clutch torque Tcdrn is represented by a relational expression using "1−x" (=xdrn), the input shaft angular acceleration dωt/dt, the transmission output torque To, and the like. In other words, the gear shift model according to the embodiment calculates the control operation amounts based on the gear shift target values using the motion equation (Expressions (1) and (2) above) of the automatic transmission 18 which include the gear shift target values and the control operation amounts and relationships (Expressions (3) and (4) above) which represent the torque sharing rate. As shown, in the embodiment, by adding a constraint set using a torque sharing rate x to the Expressions (1) and (2) above, a gear shift of the automatic transmission 18 is executed using a gear shift model. Therefore, even if there are three control operation amounts with respect to two gear shift target values, the three control operation amounts can be appropriately determined using the gear shift model. Even though there is one prescribed model as the gear shift model, as described above, since a gear train motion equation considered to be a different constant is used for each gear shift type (for example, a gear shift pattern or a gear interstage), a gear shift model corresponding to each gear shift type is to be used for a gear shift of the automatic transmission 18.

In the gear shift control of the automatic transmission 18, there are various gear shift patterns including a power-on upshift, a power-off upshift, a power-on downshift, and a power-off downshift. Therefore, a torque sharing rate is desirably set in accordance with each gear shift pattern. For example, in the embodiment, in order to appropriately promote progress of a gear shift in accordance with a gear shift pattern, a timing at which the torque sharing rate is varied is modified based on a gear shift pattern (in other words, a timing at which a torque is delivered between the releasing-side clutch and the engaging-side clutch is modified based on a gear shift pattern). Hereinafter, settings of a torque sharing rate in accordance with respective gear shift patterns will be described in detail.

Figure 3A:
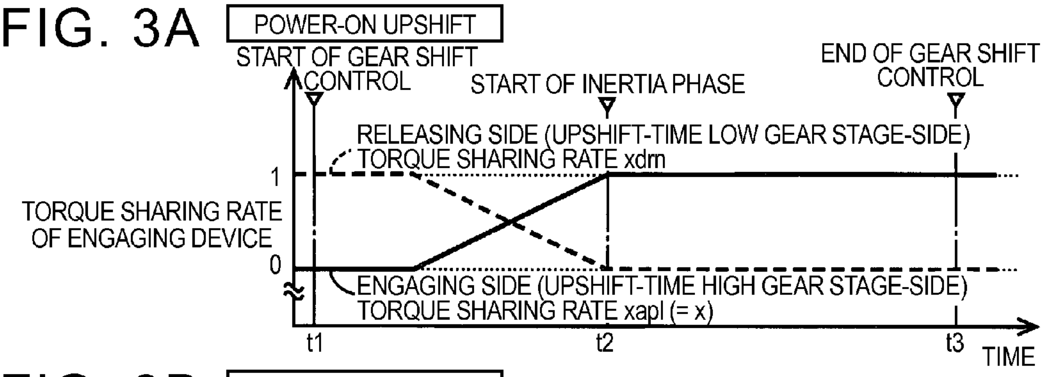
Figure 3B:
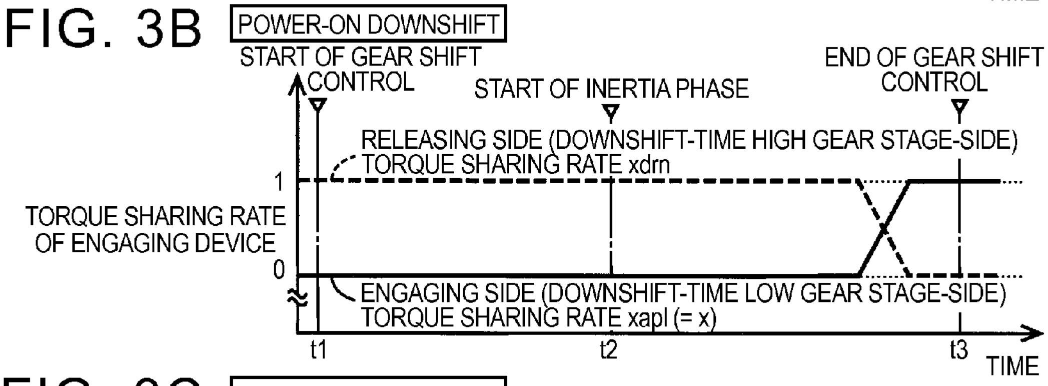
Figure 3C:
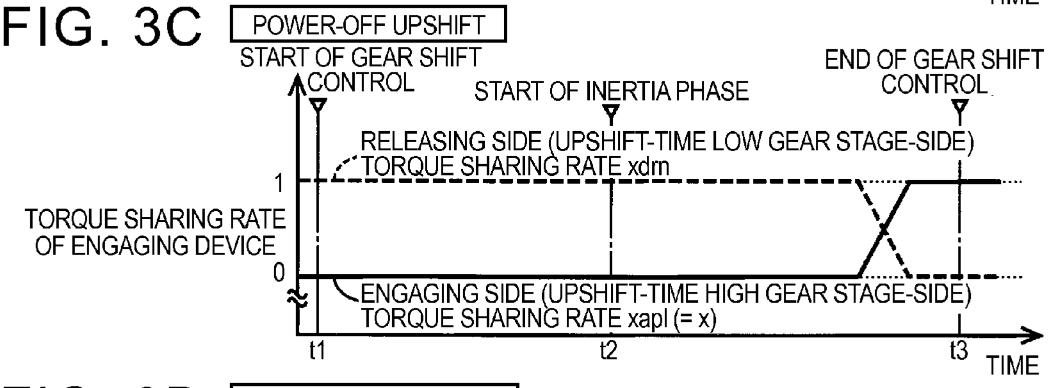
Figure 3D:
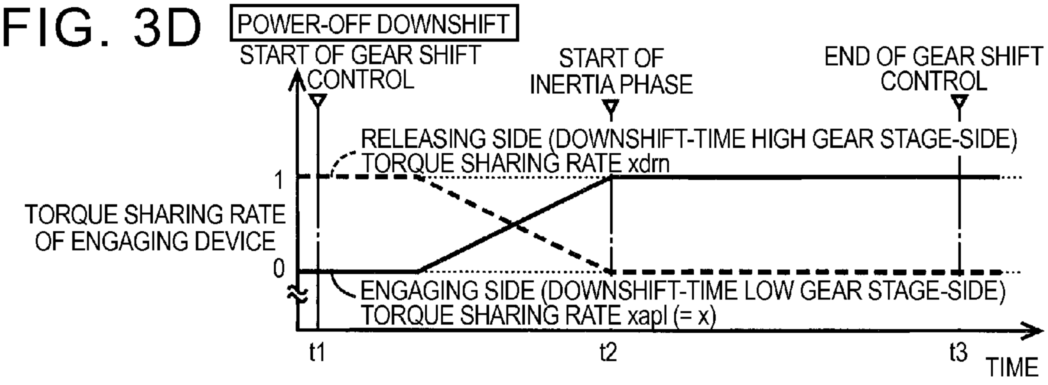

With a power-on upshift or a power-off downshift, a direction in which the turbine rotation speed ωt (in other words, the transmission input rotation speed ωi) is caused to vary by the engine torque Te (a positive torque during power-on or a negative torque during power-off (an engine friction torque)) and a direction of variation of the turbine rotation speed ωt accompanying a gear shift (a direction advanced by the gear shift) differ from each other. In other words, with a power-on upshift or a power-off downshift, progress of a gear shift cannot be promoted spontaneously by the engine torque Te. Therefore, since progress of a gear shift cannot be promoted by simply reducing an absolute value of the releasing-side clutch torque Tcdrn (by simply directing the releasing-side clutch torque towards release) without changing the torque sharing rate, it is necessary to have the engaging-side clutch cause the turbine rotation speed ωt to vary in a variation direction accompanying a gear shift. In consideration thereof, when the gear shift pattern is a power-on upshift or a power-off downshift, as shown in FIGS. 3A and 3D, a timing at which the torque sharing rate is varied is set to before a start of an inertia phase (in other words, a delivery of a torque between the releasing-side clutch and the engaging-side clutch is executed before the start of an inertia phase) to ensure that a gear shift proceeds appropriately.

On the other hand, with a power-off upshift or a power-on downshift, the turbine rotation speed ωt is caused to vary in a variation direction accompanying a gear shift due to the engine torque Te. In other words, with a power-off upshift or a power-on downshift, progress of a gear shift can be promoted spontaneously by the engine torque Te. Therefore, since progress of a gear shift can be promoted by simply reducing an absolute value of the releasing-side clutch torque Tcdrn without changing the torque sharing rate, there is no need to have the engaging-side clutch cause the turbine rotation speed ωt to vary in a variation direction accompanying a gear shift. With a power-off upshift or a power-on downshift, attempting to promote progress of a gear shift by the engaging-side clutch may have the opposite effect of possibly increasing inertia torque and aggravating a gear shift shock. In consideration thereof, when the gear shift pattern is a power-off upshift or a power-on downshift, as shown in FIGS. 3C and 3B, a timing at which the torque sharing rate is varied is set at an end of an inertia phase to ensure that a gear shift proceeds appropriately. In other words, in the case of a power-off upshift or a power-on downshift, in order to realize a smooth gear shift in which gear shift shock is suppressed, progress of a gear shift is promoted by simply releasing the releasing-side clutch in accordance with the engine torque Te. Then, by executing a delivery of a torque between the releasing-side clutch and the engaging-side clutch to coincide with the end of an inertia phase, the turbine rotation speed ωt is conformed to a synchronous rotation after the gear shift by the engaging-side clutch. In this case, an end of an inertia phase refers to a time point at which the turbine rotation speed ωt has approximately approached a synchronous rotation after the gear shift such as when an inertia phase has approximately ended. In other words, an end of an inertia phase refers to a time point near the end of an inertia phase at which even if the engaging-side clutch is not directed toward engagement, an inertia phase is started and further advanced by the engine torque Te and the release of the releasing-side clutch, and the engaging-side clutch need only be controlled toward engagement only when the turbine rotation speed ωt is synchronized with a rotation speed after the gear shift. Moreover, when an inertia phase can be advanced and ended by the engine torque Te and the release of the releasing-side clutch, the end of the inertia phase may be considered to be after the inertia phase.

Returning to FIG. 2, the gear shift speed-prioritized gear shift determining unit 78 determines whether or not gear shift control that prioritizes gear shift speed is to be selected based on performance of a manual gear shift operation for selecting a manual mode or a sport mode and/or determination of a gear shift in which a direction to which an input shaft torque is applied (a direction of an input shaft torque) and a direction in which the gear shift is to proceed (a direction in which an input shaft rotation speed increases) are consistent with each other such as a down gear shift (blipping) during deceleration travel or a power-off up gear shift. When the gear shift speed-prioritized gear shift determining unit 78 determines that gear shift control prioritizing gear shift speed is to be selected, the gear shift speed-prioritized gear shift determining unit 78 selects gear shift control by the second gear shift control unit 76, and when the gear shift speed-prioritized gear shift determining unit 78 determines that gear shift control prioritizing gear shift speed is not to be selected, the gear shift speed-prioritized gear shift determining unit 78 selects gear shift control by the first gear shift control unit 74.

When it is determined that a gear shift of the automatic transmission 18 is being performed by the first gear shift control unit 74, a first gear shift operation amount calculating unit 80 calculates the control operation amounts based on the gear shift target values using the gear shift model described above and outputs the control operation amounts to the first gear shift control unit 74. Specifically, the first gear shift operation amount calculating unit 80 includes a first torque sharing rate calculating unit 82 and a first gear shift target value calculating unit 84.

The first torque sharing rate calculating unit 82 sequentially calculates the torque sharing rate x based on an elapsed time from a variation start time (or a previous calculation time) from a relationship in which an aspect (for example, an incline) that causes the torque sharing rate x to vary is determined in advance or from a gear shift progress map as shown in, for example, FIG. 3 A and FIG. 3 D or FIG. 3 B and FIG. 3 C. In addition, from Expressions (3) and (4) above, the first torque sharing rate calculating unit 82 calculates a torque sharing rate xapl of the engaging-side clutch and a torque sharing rate xdrn of the releasing-side clutch based on the calculated torque sharing rate x. The gear shift progress map is determined in advance for, for example, each gear shift type (gear shift pattern or gear interstage). In addition, an initial value of the torque sharing rate x is set to “0”.

The first gear shift target value calculating unit 84 calculates sesquentially a target value of the input shaft angular acceleration dωt/dt in an inertia phase based on a lapsed time from an inertia phase start time (or a previous calculation time) from, for example, a relational expression (1) in which a mode that causes the input shaft angular acceleration dωt/dt to vary is determined in advance so that a variation of the turbine rotation speed ωt (=transmission input rotation speed ωi) during an inertia phase becomes a prescribed variation that satisfies both suppression of a gear shift shock and a gear shift time, or an input shaft angular acceleration variation map corresponding thereto. In addition, for example, when not in an inertia phase, the first gear shift target value calculating unit 84 calculates a target value of the input shaft angular acceleration dωt/dt based on a variation of the turbine rotation speed ωt (=transmission input rotation speed ωi). Furthermore, the first gear shift target value calculating unit 84 calculates a target value of the transmission output torque To based on the demanded drive force Fdem calculated by the engine output control unit 72 and based on a lapsed time from a gear shift control start time (or a previous calculation time) from, for example, a relational expression (2) or a transmission output torque variation map corresponding thereto. A mode that causes the transmission output torque To to vary is determined in advance in the relational expression (2). Moreover, the input shaft angular acceleration variation map and the transmission output torque variation map are determined in advance for, for example, each gear shift type (gear shift pattern or gear interstage).

The first gear shift operation amount calculating unit 80 sequentially calculates respective demanded values of the turbine torque Tt (synonymous with the engine torque Te), the engaging-side clutch torque Tcapl, and the releasing-side clutch torque Tcdrn as control operation amounts based on the torque sharing rates (x, xapl, and xdrn) of the engaging devices calculated by the first torque sharing rate calculating unit 82 and based on the respective gear shift target values (respective target values of dωt/dt and To) calculated by the first gear shift target value calculating unit 84 from relational expressions (1) and (2) for calculating the control operation amounts.

The engine output control unit 72 outputs an engine output control command signal Se so that a demanded value of the turbine torque Tt (synonymous with the engine torque Te) calculated by the first gear shift operation amount calculating unit 80 is obtained. The first gear shift control unit 74 sequentially outputs a hydraulic pressure command signal Sp for obtaining respective demanded values of the engaging-side clutch torque Tcapl and the releasing-side clutch torque Tcdrn calculated by the first gear shift operation amount calculating unit 80 to the hydraulic control circuit 28 so that a determined gear stage of the automatic transmission 18 is achieved.

When it is determined that a gear shift of the automatic transmission 18 is being performed by the second gear shift control unit 76, a second gear shift operation amount calculating unit 86 calculates the control operation amounts based on the gear shift target values using the gear shift model described above and outputs the control operation amounts to the second gear shift control unit 76. Specifically, the second gear shift operation amount calculating unit 86 includes a second torque sharing rate calculating unit 88, a second gear shift target value calculating unit 90, and a gear shift progress torque sharing rate calculating unit 92.

Figure 4:
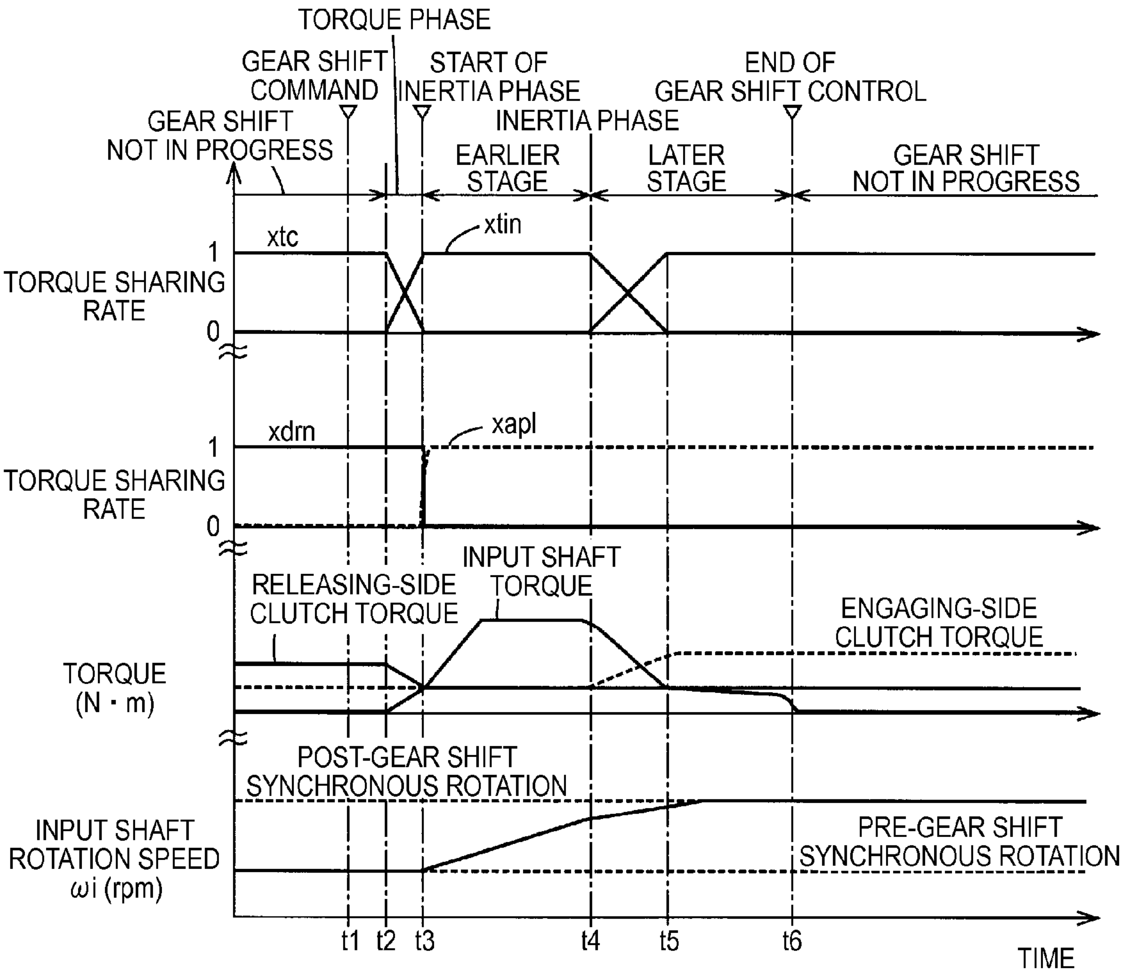
FIG. 4 is a time chart illustrating a gear shift control actuation during downshift control upon blipping of a second gear shift control unit shown in FIG. 2.
Figure 5:
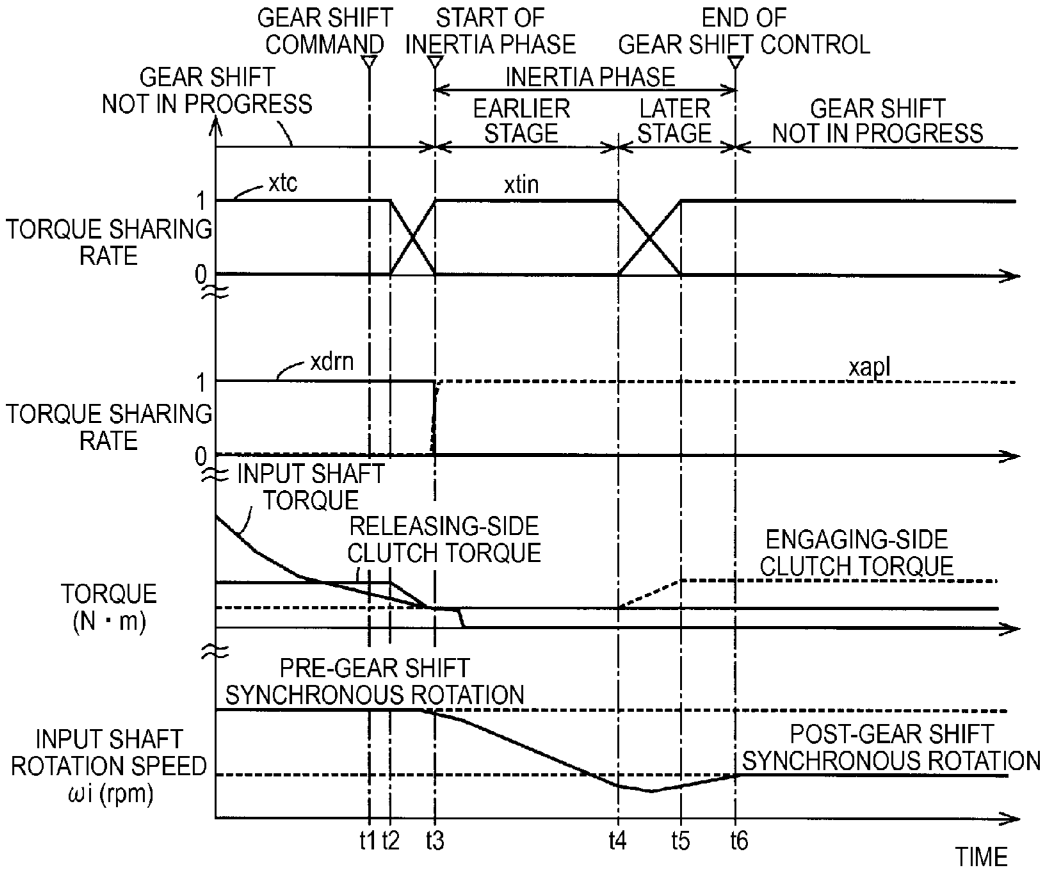
FIG. 5 is a time chart illustrating a gear shift control actuation during a power-off upshift of the second gear shift control unit shown in FIG. 2.

The second torque sharing rate calculating unit 88 sequentially calculates the torque sharing rate x based on an elapsed time from a variation start time (or a previous calculation time) from a relationship in which an aspect (for example, an incline) that causes the torque sharing rate x to vary is determined in advance or from a gear shift progress map as represented by, for example, a blipping down shown in FIG. 4 and a power-off upshift shown in FIG. 5. In addition, from Expressions (3) and (4) above, the second torque sharing rate calculating unit 88 calculates a torque sharing rate xapl of the engaging-side clutch and a torque sharing rate xdrn of the releasing-side clutch based on the calculated torque sharing rate x. The gear shift progress map is determined in advance for, for example, each gear shift type (gear shift pattern or gear interstage). In addition, an initial value of the torque sharing rate x is set to “0”. As a constraint for obtaining a gear shift target value (the input shaft angular acceleration dωt/dt in an inertia phase) when performing the second gear shift that prioritizes gear shift speed using only Expression (1), the second torque sharing rate calculating unit 88 switches a torque sharing rate xtc of the entire clutches and an input shaft torque sharing rate xtin by setting the torque sharing rate xtc of the entire clutches to “0” and the input shaft torque sharing rate xtin to “1” before the start of an inertia phase and by varying the torque sharing rate xtc of the entire clutches toward “1” at a prescribed inclination and varying the input shaft torque sharing rate xtin toward “0” at a prescribed inclination in a later stage of the inertia phase. An earlier stage of the inertia phase ends and the later stage of the inertia phase starts before the end of a variation of a turbine rotation speed cot that represents a rotation speed of the input shaft 16 or, in other words, a transmission input rotation speed ωi. In addition, after the start of the inertia phase, the second torque sharing rate calculating unit 88 immediately sets the torque sharing rate xdrn of the releasing-side clutch to “0” and the torque sharing rate xapl of the engaging-side clutch to “1” when the torque sharing rate xtc of the entire clutches is at “0”. Accordingly, since the torque sharing rate xtc of the entire clutches is set to “0” and the input shaft torque sharing rate xtin is set to “1” as constraints for uniquely calculating the control operation amount (the gear shift target value) on the left side of Expression (1), progress of a gear shift takes place using only the engine torque Te or, in other words, the input shaft torque.

In a section immediately preceding the start of an inertia phase, the gear shift progress torque sharing rate calculating unit 92 sequentially calculates the torque sharing rate xtc of the entire clutches and the input shaft torque sharing rate xtin which are gear shift progress torque sharing rates based on an elapsed time from an inertia phase start time (or a previous calculation time) from a gear shift progress sharing rate map stored in advance. Specifically, for example, in a section from time point t2 to time point t3 in FIG. 4, the torque sharing rate xtc of the entire clutches is varied from “1” to “0” at a prescribed inclination and the input shaft torque sharing rate xtin is varied from “0” to “1” at a prescribed inclination.

The second gear shift target value calculating unit 90 sequentially calculates a target value of the input shaft angular acceleration dωt/dt in an inertia phase based on an elapsed time from an inertia phase start time (or a previous calculation time) from the relational expression (1) in which an aspect that varies the input shaft angular acceleration dωt/dt is determined in advance or from an input shaft angular acceleration variation map so that, for example, a variation of the turbine rotation speed ωt (=transmission input rotation speed ωi) during an inertia phase becomes a prescribed variation that satisfies both suppression of a gear shift shock and a gear shift time. In other words, the second gear shift target value calculating unit 90 determines only the input shaft angular acceleration dωt/dt as a control target value using only the relational expression (1) and without using the relational expression (2). As described above, since Expression (2) is not used and the gear shift target value To is set to "0" (To=0), a gear shift shock does not occur even if the torque sharing rate xdrn of the releasing-side clutch is immediately set to "0" and the torque sharing rate xapl of the engaging-side clutch is immediately set to "1". Moreover, the input shaft angular acceleration variation map is determined in advance for, for example, each gear shift type (gear shift pattern or gear inter-stage).

The second gear shift operation amount calculating unit 86 sequentially calculates respective demanded values of the turbine torque Tt (synonymous with the engine torque Te), the engaging-side clutch torque Tcapl, and the releasing-side clutch torque Tcdrn as control operation amounts based on the torque sharing rates (x, xapl, and xdrn) of the engaging devices calculated by the second torque sharing rate calculating unit 88 and the respective gear shift target values (respective target values of dωt/dt and To) calculated by the first gear shift target value calculating unit 84 from relational expression (1). The engine output control unit 72 outputs an engine output control command signal Se so that a demanded value of the turbine torque Tt (synonymous with the engine torque Te) calculated by the second gear shift operation amount calculating unit 86 is obtained. While the second gear shift control unit 76 outputs a hydraulic pressure command signal Sp for obtaining respective demanded values of the engaging-side clutch torque Tcapl and the releasing-side clutch torque Tcdrn calculated by the second gear shift operation amount calculating unit 86 to the hydraulic control circuit 28 so that a determined gear stage of the automatic transmission 18 is achieved, since the torque sharing rate xtc of the entire clutches is at "0" in at least the earlier stage of an inertia phase under the second gear shift control, a gear shift proceeds while the turbine rotation speed ωt (=transmission input rotation speed ωi) is varied toward synchronous rotation solely by the engine torque Te. As described above, since Expression (2) is not used, the gear shift target value To is set to "0" (To=0), and the torque sharing rate xtc of the entire clutches is at "0" in at least the earlier stage of an inertia phase as described above, a clutch torque does not contribute to the progress of a gear shift regardless of the torque sharing rate xdrn of the releasing-side clutch and the torque sharing rate xapl of the engaging-side clutch and progress of a gear shift takes place using only the turbine torque Tt (the engine torque Te). A gear shift shock does not occur even when the turbine rotation speed ωt (=transmission input rotation speed ωi) during an inertia phase is varied relatively rapidly using the turbine torque Tt. As a result, the second gear shift that is speedier than the first gear shift is obtained.

FIG. 4 is a time chart illustrating a substantial part of an actuation when a second gear shift by the second gear shift control unit 76 is performed upon a blipping down gear shift during deceleration travel. In addition, FIG. 5 is a time chart illustrating a substantial part of an actuation when a second gear shift by the second gear shift control unit 76 is performed upon a power-off up gear shift. The blipping down gear shift and the power-off up gear shift are gear shifts in which a direction of an input shaft torque (the turbine torque Tt or the engine torque Te) and a direction in which the gear shift is to proceed (a direction in which the turbine rotation speed ωt or the input shaft rotation speed ωi increases) are consistent with each other and correspond to the second gear shift. In the blipping down gear shift shown in FIG. 4, after a gear shift command is issued at time point t1, in a torque phase section from time point t2 before start of an inertia phase to time point t3 at which the inertia phase starts, an input shaft torque is generated in accordance with the torque sharing rate xtc of the entire clutches that is a gear shift progress torque sharing rate being varied from "1" to "0" and the input shaft torque sharing rate xtin that is a gear shift progress torque sharing rate being varied from "0" to "1", and in a state where the torque sharing rate xtc of the entire clutches is set at "0" in an earlier stage of the inertia phase from time point t3 to time point t4, the torque sharing rate xdrn of the releasing-side clutch is suddenly varied from "1" to "0" and the torque sharing rate xapl of the engaging-side clutch is suddenly varied from "0" to "1" and, at the same time, the input shaft torque (the turbine torque Tt or the engine torque Te) is increased from "0" to raise the input shaft rotation speed ωi representing a gear shift progress up to immediately below a post-gear shift synchronous rotation. In a later stage of the inertia phase from time point t4 to time point t6, in a first half of the later stage up to time point t5, the torque sharing rate xtc of the entire clutches is varied from "0" to "1" and the input shaft torque sharing rate xtin is varied from "1" to "0" and, at the same time, the input shaft torque is reduced toward a value after the gear shift. As a result, the input shaft rotation speed wi asymptotically approaches the post-gear shift synchronous rotation and is synchronized at around time point t5. In addition, in the later stage of the inertia phase, since the variation of the torque sharing rate xapl of the engaging-side clutch from "0" to "1" is validated as the torque sharing rate xtc of the entire clutches is varied from "0" to "1", the engaging-side clutch torque is generated and increased to a value after the gear shift.

In the power-off up gear shift shown in FIG. 5, after a gear shift command is issued at time point t1, in a torque phase section from time point t2 before start of an inertia phase to time point t3 at which the inertia phase starts, the torque sharing rate xtc of the entire clutches is varied from "1" to "0" and the input shaft torque sharing rate xtin is varied from "0" to "1". During this period, in response to a power off operation, the input torque (the turbine torque Tt or the engine torque Te) is reduced. Next, in a state where the torque sharing rate xtc of the entire clutches is set to "0" in an earlier stage of the inertia phase from time point t3 to time point t4, the torque sharing rate xdrn of the releasing-side clutch is suddenly varied from "1" to "0" and the torque sharing rate xapl of the engaging-side clutch is suddenly varied from "0" to "1" and, at the same time, since the input shaft torque (the turbine torque Tt or the engine torque Te) is maintained at a low value corresponding to the power off operation, the input shaft rotation speed ωi representing a gear shift progress is reduced to immediately below the post-gear shift synchronous rotation in association with the input shaft torque sharing rate xtin being set to "1". In a later stage of the inertia phase from time point t4 to time point t6, in a first half of the later stage up to time point t5, the torque sharing rate xtc of the entire clutches is varied from "0" to "1" and the input shaft torque sharing rate xtin is varied from "1" to "0" and, at the same time, the input shaft torque is reduced toward a value after the gear shift. As a result, the input shaft rotation speed ωi asymptotically approaches the post-gear shift synchronous rotation and is synchronized at around time point t5 to time point t6. In addition, in the later stage of the inertia phase, since the variation of the torque sharing rate xapl of the engaging-side clutch from "0" to "1" is validated as the torque sharing rate xtc of the entire clutches is varied from “0” to “1”, the engaging-side clutch torque is generated and increased to a value after the gear shift.

Figure 6:
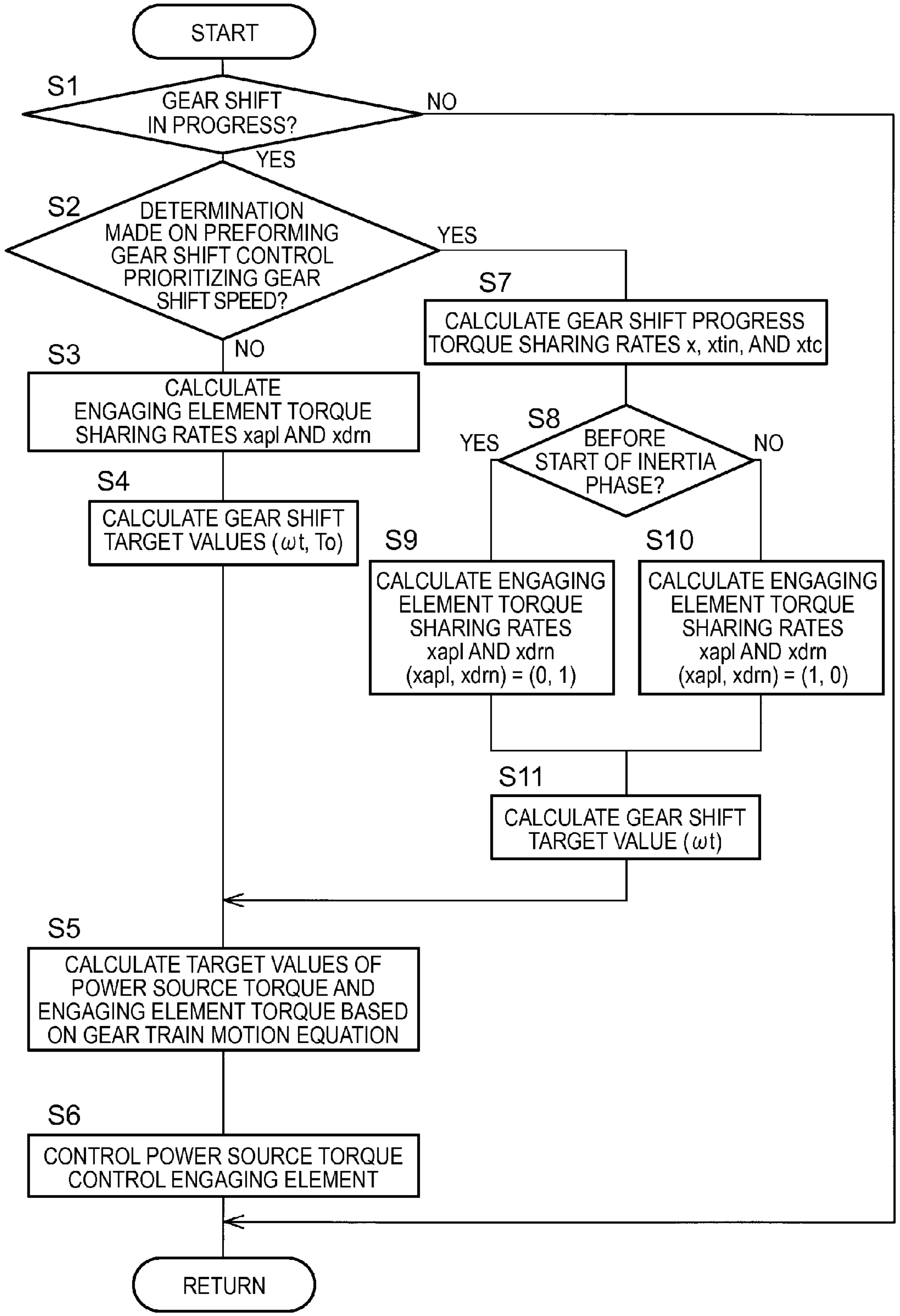
FIG. 6 is a flow chart illustrating a substantial part of a control actuation of the electronic control unit shown in FIG. 1.

FIG. 6 is a flow chart illustrating a substantial part of a control actuation of the electronic control unit which is repetitively executed at a cycle time of, for example, around several ms to several ten ms.

In FIG. 6, in step S1 (hereinafter, the term “step” will be omitted), a determination is made on whether or not a gear shift is being performed. When the determination of S1 is negative, the routine is terminated. However, when the determination of S1 is positive, in S2 corresponding to the gear shift speed-prioritized gear shift determining unit 78, a determination is made on whether or not a gear shift speed-prioritized gear shift is being performed based on performance of a manual gear shift operation for selecting a manual mode or a sport mode and/or a determination of a gear shift in which a direction of an input shaft torque and a direction in which the gear shift is to proceed (a direction in which an input shaft rotation speed increases) are consistent with each other such as a down gear shift (blipping) during deceleration travel or a power-off up gear shift.

When the determination of S2 is negative, S3 to S6 for executing a first gear shift are executed. Specifically, first, in S3 corresponding to the first torque sharing rate calculating unit 82, torque sharing rates (x, xapl, and xdrn) of the respective engaging devices are calculated based on an elapsed time from, for example, a map stored in advance. Next, in S4 corresponding to the first gear shift target value calculating unit 84, respective gear shift target values (respective target values of the input shaft angular acceleration dωt/dt and the transmission output torque To) are calculated. Subsequently, in S5 corresponding to the first gear shift operation amount calculating unit 80, from the relational expressions (1) and (2) for calculating the control operation amounts, the control operation amounts (respective demanded values of the engine torque Te, the engaging-side clutch torque Tcapl, the releasing-side clutch torque Tcdrn, and other clutch torques) are sequentially calculated based on the torque sharing rates (x, xapl, and xdrn) of the respective engaging devices and the respective gear shift target values (respective target values of dωt/dt and To) calculated in S3 and S4. Next, in S6 corresponding to the engine output control unit 72 and the first gear shift control unit 74, the engine output control command signal Se and the hydraulic pressure command signal Sp are outputted so that the respective control operation amounts calculated in S5 are obtained and the engine 12, the releasing-side clutch, the engaging-side clutch, and other engaging devices are controlled to execute the first gear shift.

On the other hand, when the determination of S2 is positive, S7 to S11, S5, and S6 for executing a second gear shift are executed. Specifically, first, in S7 corresponding to the gear shift progress torque sharing rate calculating unit 92, in a section immediately preceding the start of an inertia phase, the torque sharing rate xtc of the entire clutches and the input shaft torque sharing rate xtin which are gear shift progress torque sharing rates are sequentially calculated based on an elapsed time from an inertia phase start time (or a previous calculation time) from a gear shift progress sharing rate map stored in advance. Specifically, for example, in a section from time point t2 to time point t3 in FIG. 4, the torque sharing rate xtc of the entire clutches is varied from “1” to “0” at a prescribed inclination and the input shaft torque sharing rate xtin is varied from “0” to “1” at a prescribed inclination. Next, in S8 to S10 corresponding to the second torque sharing rate calculating unit 88, the torque sharing rate xdrn of the releasing-side clutch and the torque sharing rate xapl of the engaging-side clutch are sequentially calculated based on an actual elapsed time from a map stored in advance. In other words, a determination is made in S8 on whether or not an inertia phase is yet to be started, and when the determination of S8 is positive, in S9, the torque sharing rate xdrn of the releasing-side clutch is set to “1” and the torque sharing rate xapl of the engaging-side clutch is set to “0”. However, when the determination of S8 is negative, in S10, the torque sharing rate xdrn of the releasing-side clutch is set to “0” and the torque sharing rate xapl of the engaging-side clutch is set to “1”. Subsequently, in S11 corresponding to the second gear shift target value calculating unit 90, target values of the input shaft angular acceleration dωt/dt in the inertia phase are sequentially calculated based on the elapsed time from the inertia phase start time (or a previous calculation time) from the relational expression (1). In addition, in S5 corresponding to the second gear shift operation amount calculating unit 86, from the relational expression (1) for calculating the control operation amounts, the control operation amounts (respective demanded values of the engine torque Te, the engaging-side clutch torque Tcapl, the releasing-side clutch torque Tcdrn, and other clutch torques) are sequentially calculated based on the torque sharing rates (x, xapl, and xdrn) and the gear shift target value dωt/dt calculated in S7 and S9 or in S10 and S11. Next, in S6 corresponding to the engine output control unit 72 and the second gear shift control unit 76, the engine output control command signal Se and the hydraulic pressure command signal Sp are outputted so that the respective control operation amounts calculated in S5 are obtained and the engine 12, the releasing-side clutch, the engaging-side clutch, and other engaging devices are controlled to execute the second gear shift having a speedier gear shift progress than the first gear shift.

As described above, according to the embodiment, in implementing first gear control, since the torque sharing rate x is set as a constraint in consideration of the fact that the motion equation represented by Expressions (1) and (2) cannot be solved unless some kind of constraint is set, the first embodiment is suitable for controlling delivery of a torque between engaging devices that is considered difficult in gear shift control and the motion equation can be solved. From another perspective, since the torque sharing rate x expressing delivery of a torque is set as a constraint, any gear shift pattern can be accommodated by a prescribed gear shift model. Specifically, by setting the torque sharing rate x that is suitable for controlling gear shift progress as a constraint, an occurrence of a tip-up or a blow-up can be suppressed or, conversely, controllability of control for intentionally generating a tie-up or a blow-up can be improved. In addition, setting a torque on the input shaft-side rotating member of an engaging device (for example, a clutch) as a constraint may prevent control for temporarily varying an output torque of the drive power source from being executed. However, according to the invention, for example, engine torque down control that temporarily reduces the output torque of the drive power source during an inertia phase can be suitably executed. As shown, according to the first gear shift according to the embodiment, even if there are three control operation amounts with respect to two gear shift target values, the three control operation amounts can be suitably determined using a gear shift model and a desired gear shift of the automatic transmission 18 that realizes the two gear shift target values can be executed.

In addition, with the second gear shift according to the embodiment, by setting the gear shift target value solely based on a velocity variation dωt/dt of a rotating member on the input shaft side, using a gear train motion equation (1) having a velocity variation dωt/dt of a rotating member on the input shaft side among the engaging devices as a gear shift target value instead of a gear train motion equation (2) having a torque of a rotating member on the output shaft side among the engaging devices as a gear shift target value, using three values including a torque (the engine torque Te) on a rotating member on the input shaft side, a torque capacity Tcapl of an engaging-side engaging device during the gear shift, and a torque capacity Tcdrn of a releasing-side engaging device during the gear shift as the control operation amounts (control demanded values) with respect to the gear train motion equation (1), and using torque sharing rates (xapl and xdrn) of a transmission torque that is shared between the engaging-side engaging device and the releasing-side engaging device during the gear shift and gear shift progress torque sharing rates (xtc and xtin) which are sharing rates of a transmission torque that is shared between the rotating member on the input shaft side and an entirety of the clutches during the gear shift, the second gear shift in which a gear shift of the automatic transmission 18 is controlled at a higher speed than the first gear shift can be executed using a gear shift model expressed by the gear train motion equation (1). Therefore, according to the embodiment, since a first gear shift and a second gear shift that enables a gear shift to proceed at a higher speed than the first gear shift can be selectively executed, for example, with a gear shift in which a direction of an input shaft torque and a direction in which the gear shift is to proceed (a direction in which an input shaft rotation speed increases) are consistent with each other such as a down gear shift during deceleration travel or a power-off up gear shift, a speedy gear shift is achieved by selecting the second gear shift.

Furthermore, in the embodiment, the torque sharing rates (xapl and xdrn) are torque sharing rates of a transmission torque that is shared between the engaging-side engaging device and the releasing-side engaging device when the transmission torque shared between both engaging devices during a gear shift is replaced with a torque on a rotating member on the input shaft side. In addition, in a similar manner, the gear shift progress torque sharing rates (xtc and xtin) are torque sharing rates when the transmission torque shared between the rotating member on the input shaft side and the entire clutches is replaced with a torque on a rotating member on the input shaft side.

Furthermore, in the embodiment, since the gear shift model used in the first gear shift includes a first gear train motion equation (1) having a velocity variation dwt/dt of a rotating member on the input shaft side as a gear shift target value and a control operation amount and a second gear train motion equation (2) having a torque To on a rotating member on the output shaft side as a gear shift target value and a control operation amount and calculates the control operation amounts based on the velocity variation dωt/dt and the torque To using torque sharing rates, control related to torque delivery between the releasing-side engaging device and the engaging-side engaging device which is considered difficult in gear shift control can be reflected in the motion equations and the three control operation amounts can be appropriately determined.

In addition, in the embodiment, since the gear shift model used in the second gear shift includes the first gear train motion equation (1) having a velocity variation dωt/dt of the rotating member on the input shaft side as a gear shift target value and a control operation amount and calculates the control operation amount based on the velocity variation dωt/dt using torque sharing rates (xapl and xdrn) and gear shift progress torque sharing rates (xtc and xtin), control related to torque delivery between the releasing-side engaging device and the engaging-side engaging device which is considered difficult in gear shift control can be reflected in the motion equation and the three control operation amounts can be appropriately determined.

Furthermore, in the embodiment, on the basis of a gear shift in which a direction of an input shaft torque and a direction in which the gear shift is to proceed (a direction in which an input shaft rotation speed increases) are consistent with each other such as a manual gear shift operation including a manual mode and a sport mode and/or a down gear shift during deceleration travel or a power-off up gear shift, a gear shift speed-prioritized gear shift determining unit 78 (S2) is provided which determines whether or not gear shift control that prioritizes gear shift speed is to be selected. When the gear shift speed-prioritized gear shift determining unit 78 determines that gear shift control prioritizing gear shift speed is to be selected, the second gear shift is selected, and when the gear shift speed-prioritized gear shift determining unit 78 determines that gear shift control prioritizing gear shift speed is not to be selected, the first gear shift is selected. Therefore, since the second gear shift that achieves speedy gear shift progress is selected for a manual gear shift operation and/or a gear shift in which a direction of an input shaft torque and a direction in which the gear shift is to proceed (a direction in which an input shaft rotation speed increases) are consistent with each other, a preferable gear shift feel can be achieved.

While an embodiment of the invention has been described in detail based on the drawings, the invention can also be applied to other modes.

For example, while the torque sharing rates (xapl and xdrn) are applied at time point t3 in FIG. 4 in the second gear shift according to the embodiment described above, the torque sharing rates (xapl and xdrn) may be applied at any position as long as the position is within a section where the gear shift progress torque sharing rate xtc is at “0”.

In addition, in the embodiment described above, the vehicle transmits drive force outputted from the engine 12 to the drive wheel 26 via a power transmission apparatus such as the automatic transmission 18. In the automatic transmission 18, the number of stages that make up the plurality of shift stages may be modified as appropriate. Furthermore, as the plurality of engaging devices that perform clutch-switching to switch among the shift stages, engaging devices such as a multi-plate or single plate clutch or a brake which is engaged by a hydraulic actuator and a band brake are widely used. Alternatively, electromagnetic engaging devices or magnetic-particle engaging devices may be used besides hydraulic engaging devices.

In addition, while an engine such as a gasoline engine or a diesel engine is preferably used as the engine 12 according to the embodiment described above, alternatively, for example, a motor such as an electric motor may be used independently or in combination with the engine as the drive power source.

Furthermore, while the output shaft 20 has been exemplified as a rotating member on the side of the output shaft 20 in the embodiments described above, this is not restrictive and the rotating member on the side of the output shaft 20 may be any rotating member on the power transmission path from the output shaft 20 to the drive wheel 26. While the input shaft 16 has been exemplified as a rotating member on the side of the input shaft 16, this is not restrictive and the rotating member on the side of the input shaft 16 may be any rotating member on the power transmission path from the engine 12 to the input shaft 16.

It is to be understood that the description provided above simply represents preferred embodiments of the invention and that the invention can be embodied in various modified or improved forms based on the knowledge of those skilled in the art.

What is claimed is:

1. A gear shift control apparatus for a vehicle, comprising:

an automatic transmission including a plurality of engaging devices configured to transmit rotation and torque between an input shaft that receives power from a drive power source and an output shaft that transmits the power to a drive wheel, the automatic transmission being configured to execute a gear shift by switching between engagement and release of the plurality of engaging devices; and an electronic control unit comprising a microcomputer configured to execute the gear shift of the automatic transmission by using a predetermined gear shift model that determines a control operation amount for obtaining a gear shift target value, the electronic control unit being configured to selectively execute a first gear shift and a second gear shift as the gear shift based on satisfaction of a predetermined criteria, the electronic control unit being configured to set the gear shift target value of the first gear shift by using torque on a rotating member on an output shaft side among the engaging devices and a rotation speed variation of a rotating member on an input shaft side among the engaging devices, the electronic control unit being configured to set the control operation amount of the first gear shift by using torque on the rotating member on the input shaft side, a torque capacity of an engaging-side engaging device during the first gear shift, and a torque capacity of a releasing-side engaging device during the first gear shift, the electronic control unit being configured to set a first torque sharing rate of a transmission torque that is shared between the engaging-side engaging device and the releasing-side engaging device during the first gear shift, the electronic control unit being configured to control the gear shift of the automatic transmission during the first gear shift by using the gear shift model including the set gear shift target value of the first gear shift, the set control operation amount of the first gear shift, and the set first torque sharing rate, the electronic control unit being configured to set the gear shift target value of the second gear shift by using only the rotation speed variation of the rotating member on the input shaft side, the electronic control unit being configured to set the control operation amount of the second gear shift by using torque on the rotating member on the input shaft side, a torque capacity of the engaging-side engaging device during the second gear shift, and a torque capacity of the releasing-side engaging device during the second gear shift, the electronic control unit being configured to set a second torque sharing rate of a transmission torque that is shared between the engaging-side engaging device and the releasing-side engaging device during the second gear shift, the electronic control unit being configured to set a gear shift progress torque sharing rate that is a sharing rate of a transmission torque that is shared between the rotating member on the input shaft side and an entirety of the engaging devices during the second gear shift, and the electronic control unit being configured to execute the gear shift of the automatic transmission during the second gear shift in a speedier manner than during the first gear shift by using the gear shift model including the set gear shift target value of the second gear shift, the set control operation amount of the second gear shift, the set second torque sharing rate, and the set gear shift progress torque sharing rate.

2. The gear shift control apparatus according to claim 1, wherein the electronic control unit is configured to set the first torque sharing rate as a ratio at which torque on the rotating member on the input shaft side is shared between the engaging-side engaging device and the releasing-side engaging device when the transmission torque that is shared between the engaging-side engaging device and the releasing-side engaging device during the first gear shift is assumed to be the torque on the rotating member on the input shaft side, the electronic control unit is configured to set the second torque sharing rate as a ratio at which torque on the rotating member on the input shaft side is shared between the engaging-side engaging device and the releasing-side engaging device when the transmission torque that is shared between the engaging-side engaging device and the releasing-side engaging device during the second gear shift is assumed to be the torque on the rotating member on the input shaft side, and the electronic control unit is configured to set the gear shift progress torque sharing rate to be a torque sharing rate when a transmission torque that is shared between the rotating member on the input shaft side and the entirety of the engaging devices during the second gear shift is assumed to be torque on the rotating member on the input shaft side.

3. The gear shift control apparatus according to claim 1, wherein the electronic control unit is configured to set the gear shift model of the first gear shift to include a first gear train motion equation having the rotation speed variation of the rotating member on the input shaft side as the gear shift target value and the control operation amount, and a second gear train motion equation having the torque on the rotating member on the output shaft side as the gear shift target value and the control operation amount, and the electronic control unit is configured to set, by using the first torque sharing rate, the gear shift model of the first gear shift in which the control operation amount is calculated based on the gear shift target value.

4. The gear shift control apparatus according to claim 1, wherein the electronic control unit is configured to set the gear shift model of the second gear shift to include a first gear train motion equation having the rotation speed variation of the rotating member on the input shaft side as the gear shift target value and the control operation amount, and the electronic control unit is configured to set, using the second torque sharing rate and the gear shift progress torque sharing rate, the gear shift model of the second gear shift in which the control operation amount is calculated based on the gear shift target value.

5. The gear shift control apparatus according to claim 4, wherein the electronic control unit is configured to set the gear shift progress torque sharing rate to be a sharing rate of a transmission torque that is shared by the entirety of the engaging devices and a torque sharing rate of the rotating member on the input shaft side, and the electronic control unit is configured to set the sharing rate of the transmission torque that is shared by the entirety of the engaging devices and the torque sharing rate of the rotating member on the input shaft side to respectively be "1" and "0" before a start of an inertia phase of the second gear shift and to respectively be "0" and "1" after the start of the inertia phase of the second gear shift.

6. The gear shift control apparatus according to claim 4, wherein the electronic control unit is configured to set the torque sharing rate of the engaging-side engaging device and the torque sharing rate of the releasing-side engaging device to respectively be "0" and "1" before a start of an inertia phase of the second gear shift and to respectively be "1" and "0" after the start of the inertia phase of the second gear shift as the second torque sharing rate.

7. The gear shift control apparatus according to claim 1, wherein the electronic control unit is configured to determine whether a demanded gear shift is a gear shift in which a direction of an input shaft torque of the input shaft and a direction in which a rotation speed of the rotating member on the input shaft side increases are consistent with each other, the electronic control unit is configured to determine whether gear shift control that prioritizes gear shift speed is to be selected based on the demanded gear shift being the gear shift in which the direction of the input shaft torque of the input shaft and the direction in which the rotation speed of the rotating member on the input shaft side increases are consistent with each other, the electronic control unit is configured to select the second gear shift when the electronic control unit determines that the gear shift control prioritizing gear shift speed is to be selected, and the electronic control unit is configured to select the first gear shift when the electronic control unit determines that the gear shift control prioritizing gear shift speed is not to be selected.

* * * * *